United States Patent [19]
Sudai et al.

[11] Patent Number: 5,950,200
[45] Date of Patent: Sep. 7, 1999

[54] METHOD AND APPARATUS FOR DETECTION OF RECIPROCAL INTERESTS OR FEELINGS AND SUBSEQUENT NOTIFICATION

[75] Inventors: Gil S. Sudai, 347 Fern St.; David J. Blumberg, 1340 Washington St. #11, both of San Francisco, Calif. 94108

[73] Assignees: Gil S. Sudai; David J. Blumberg, both of San Francisco, Calif.

[21] Appl. No.: 08/788,522

[22] Filed: Jan. 24, 1997

[51] Int. Cl.$^6$ .................................................. G06R 17/30
[52] U.S. Cl. ....................................................... 707/9
[58] Field of Search .................................. 707/1, 3, 5, 6, 707/9

[56] References Cited

U.S. PATENT DOCUMENTS

| | | | |
|---|---|---|---|
| 5,659,731 | 8/1997 | Gustafson | 707/4 |
| 5,717,923 | 2/1998 | Dedrick | 707/102 |
| 5,754,939 | 5/1998 | Herz et al. | 455/4.2 |
| 5,761,662 | 6/1998 | Dasan | 707/10 |

OTHER PUBLICATIONS

Web Page for Match.Com; Online Matchmaking Service; URL+http://www.match.com/link.cgi/375938629100/welcome.tpl, Copyright 1993–1996; 1 page.

Web Page for Match.Com; URL+http://www.match.com/link.cgi/375938629100/browse–prompt.tpl; publication date unknown; 2 pages.

Web Page for Match.Com; URL+http://www.match.com/link.cgi/375938629100/main–menu–secure.tpl; publication date unknown; 4 pages.

Web Page for PlanetAll Corp.; URL+http://members.planetall.com/contacts/head.dbm; publication date unknown; 1 page.

Web Page for PlanetAll Corp.; URL+http://www.planetall.com/Press/press.dbm; apparently published on or after Jan. 24, 1997; 3 pages.

Web Page for PlanetAll Corp.; URL+http://members.planetall.com/contacts/EmailSleepers.dbm; publication date unknown; 1 page.

Web Page for PlanetAll Corp.; URL+http://members.planetall.com/contacts/EmailSleepers–submit.dbm; publication date unknown; 1 page.

Web Page for PlanetAll Corp.; URL+http://www.planetall.com/tour/sample–email.htm; Dec. 6, 1996; 2 pages.

Web Page for People Will Talk URL+http://lcs.www.media.mit.edu/people/foner/Yenta/people–will–talk.html, 1 page, Dec. 13, 1994.

Web Page for Overview of Yenta URL+http://lcs.www.media.mit.edu/people/foner/Yenta/overview.html, 2 pages, Dec. 13, 1994.

Web Page for Overview of Matchmaking Process URL+http://lcs.www.media.mit.edu/people/foner/Yenta/matchmaker–overview.html, 1 page, Dec. 13, 1994.

Web Page for Yenta URL+http://foner.www.media.mit.edu/people/foner/yenta–brief.html, 2 pages, Feb. 11, 1997.

*Primary Examiner*—Jack M. Choules
*Attorney, Agent, or Firm*—Grahahm & James LLP

[57] ABSTRACT

A method and apparatus for automating the process of confidentially determining whether people feel mutual attraction or have mutual interests and for automating the process of notifying the people involved of such a match in feelings or interests, while allowing anonymity if no mutual attraction or interests exist. A computer system receives inputs from various persons indicating the identities of persons for whom they feel attraction or with whom they share mutual interests. The system collects this information and periodically searches for matches, i.e., for mutual attractions or interests that have been entered into the system. No notification occurs unless the system determines that a match in attraction or interests exists. If a first person's feelings or interests are not mirrored by a second person, the system will not notify either person and only the computer system will be aware of the first person's feelings for the second person.

31 Claims, 15 Drawing Sheets

| User ID | Objects | | | | | Type of Attraction/ Interest |
|---|---|---|---|---|---|---|
| 1 | User ID #1 | Object ID #1 | Object ID #2 | Object ID #3 | Object ID #4 | Object ID #5 |
| 2 | User ID #2 | Object ID #1 | Object ID #2 | | | |
| 3 | User ID #3 | Object ID #1 | | | | |
| 4 | User ID #4 | Object ID #1 | | | | |
| ⋮ | | | | | | |
| N | User ID #N | Object ID #1 | Object ID #2 | | | |

| User ID | Objects | | | | Type of Attraction |
|---|---|---|---|---|---|
| John@yahoo.com | Kim@lycos.com | | | | love |
| Paul@yahoo.com | Kim@lycos.com | John@yahoo.com | Linda@excite.com | Tom@Compuserve.com | like |
| Linda@excite.com | Tom@Compuserve.com | Kim@lycos.com | | | like |
| Kim@Lycos.com | John@yahoo.com | | | | love |
| Tom@Compuserve.com | Linda@excite.com | | | | love |

FIG. 7A

| User ID | Objects | | | | Type of Attraction |
|---|---|---|---|---|---|
| John Smith | Kim Brown | | | | love |
| Paul Smith | Kim Brown | John Smith | | | like |
| Linda Jones | Tom Green | Kim Brown | Tom Green | | like |
| Kim Brown | John Smith | | | | love |
| Tom Green | Linda Jones | | | | love |

FIG. 7B

TO: John@Yahoo.com
FROM: The Love Detector

Congratulations. Both you and Kim@lycos.com have indicated mutual attraction. Good luck.

TO: Kim@lycos.com
FROM: The Love Detector

Congratulations. Both you and John@yahoo.com have indicated mutual attraction. Good luck.

FIG. 8A

TO: John@Yahoo.com
FROM: The Love Detector

Congratulations. Both you and your love interest #1 have indicated mutual attraction. Good luck.

TO: Kim@lycos.com
FROM: The Love Detector

Congratulations. Both you and your love interest #1 have indicated mutual attraction. Good luck.

FIG. 8B

METHOD AND APPARATUS FOR DETECTION OF RECIPROCAL INTERESTS OR FEELINGS AND SUBSEQUENT NOTIFICATION

FIELD OF THE INVENTION

This application relates to computer software and, specifically, to a method and apparatus for confidentially determining matches in feelings and interests entered into the system by human beings and for notifying the human beings only in cases when a mutual match in feelings or interests occurs.

BACKGROUND OF THE INVENTION

Human relationships are often fraught with difficulties. In addition, human beings are risk-adverse. Often, even when two people want to initiate first steps in a relationship, neither person takes action because of shyness, fear of rejection, or other societal pressures or constraints. Various systems exist that help people meet each other. For example, computer dating services allow people to view video tapes or pictures of prospective partners or to choose common areas of hobbies. Two people are introduced only if both agree with the idea. Unfortunately, in such situations, neither person has actually met the other when they are finally introduced. Neither person has ever met the other, and there is a certain amount of shyness and fear of rejection when they first meet in such a situation. In addition, both persons must initially approach the dating service. For some people, such an action can also be embarrassing. What is needed is a safe, simple, confidential, and non-judgmental way for people to reveal their true feelings and interests without risk of embarrassment or rejection.

SUMMARY OF THE INVENTION

The present invention overcomes the problems and disadvantages of the prior art by automating the process of confidentially determining whether two people feel mutual attraction or interest and, further, by automating the process of informing the people involved of such a match in feelings or interests, while maintaining complete anonymity unless a match of feelings or interests occurs.

In a preferred embodiment of the present invention, a computer system receives inputs from various persons indicating the identities of persons they already know (e.g., in person or online) that they like, are attracted to, or have mutual interests with. The system collects this information and searches for matches, i.e., for mutual feelings or interests that have been entered into the system. In a simple case, for example, if A and B know each other, if A enters information saying that A is attracted to B, and B enters information saying that B is attracted to A, then the system determines that a match has occurred and notifies both A and B of the mutual attraction. As a second example, if A and B know each other, if A enters information saying that A has a mutual interest with B, and B enters information saying that B has a mutual interest with A, then the system determines that a match has occurred and notifies both A and B of their shared interest.

Thus, the present invention provides an provides a safe, confidential and non-judgmental way for people to make their feelings and interests known without risk of embarrassment of fear of rejection. The present invention also provides an automatic way of notifying people of shared attraction or interests. The system maintains the anonymity of the participants because no notification occurs unless the system determines that a match in feelings or interests exists, Thus, in the example, A will not be embarrassed by having to publicly admit unrequited love or attraction for B. If A's feelings are not mirrored by B, the system will not notify B and only the computer system will be aware of A's feelings for B.

In accordance with the purpose of the invention, as embodied and broadly described herein, the invention is a method notifying people that they feel mutual interest, comprising the steps, performed by a processor of a data processing system having a memory, of; receiving input from a first user indicating a user ID of a first object in whom the first user has an interest; receiving input from a second user indicating a user ID of a second object in whom the second user has an interest; determining whether the user ID of the first object matches a user ID of the second user and whether the user ID of the second object matches a user ID of the first user; and if a match occurs in the determining step, notifying the first user and the second user that a match has occurred.

In further accordance with the purpose of this invention, as embodied and broadly described herein, the invention is an apparatus that confidentially notifies people that they feel mutual interest, comprising a first input portion, configured to receive input from a first user indicating a user ID of a first object in whom the first user has an interest; a second input portion, configured to receive input from a second user indicating a user ID of a second object in whom the second user has an interest; a determining portion, coupled to the first and second input portions, configured to determine whether the user ID of the first object matches a user ID of the second user and whether the user ID of the second object matches a user ID of the first user; and a notifying portion, coupled to the determining portion, configured to notify the first user and the second user that the determining portion has detected a match, wherein the determining step is performed at a predetermined interval.

Advantages of the invention will be set forth in part in the description which follows and in part will be obvious from the description or may be learned by practice of the invention. The objects and advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 5 is an exemplary format of a database used in conjunction with a preferred embodiment of the present invention.

FIGS. 7(a) and 7(b) show examples of database entries representing mutual interest.

FIGS. 8(a) and 8(b) show examples of e-mail messages indicating mutual interest.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
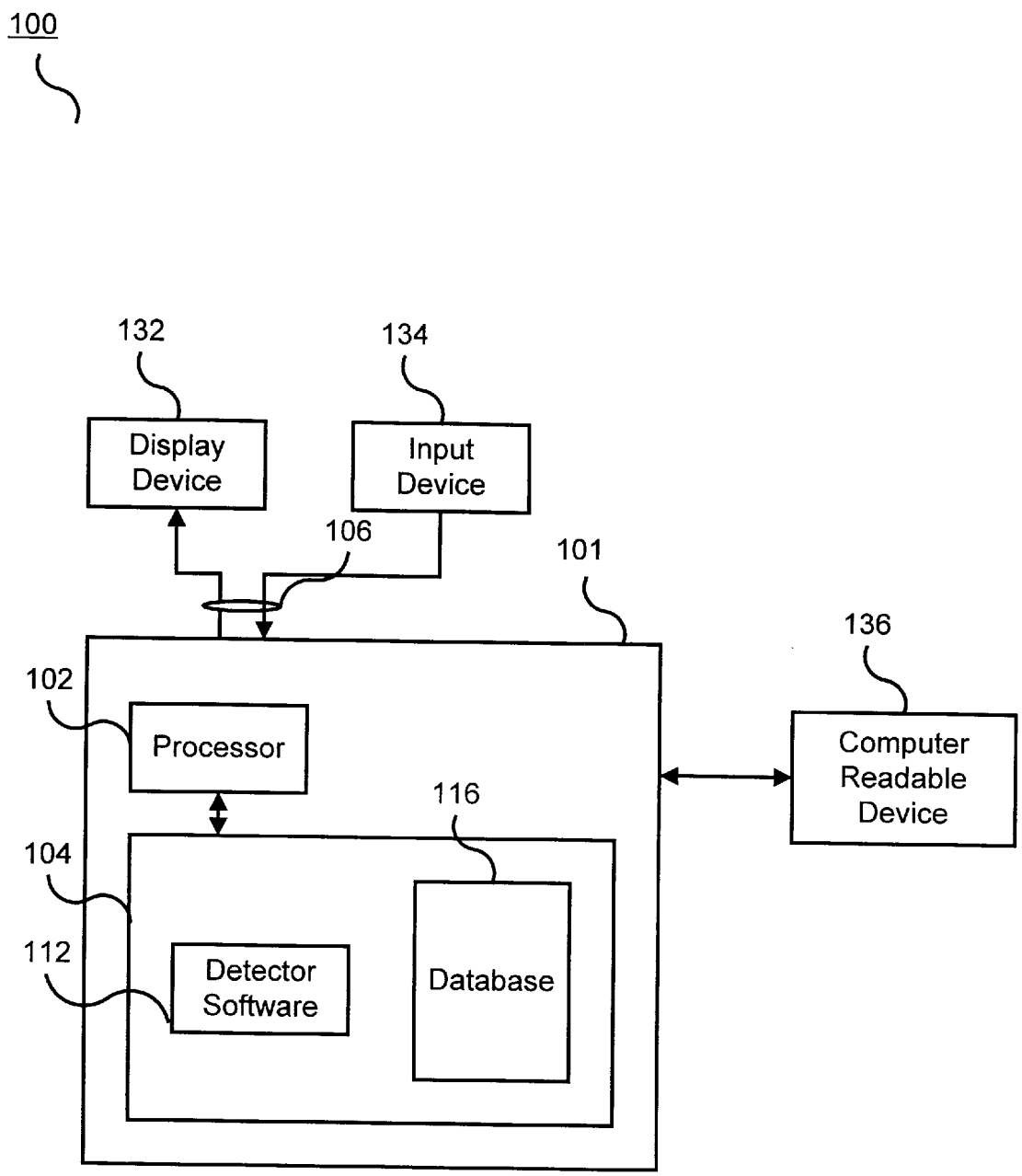
FIG. 1 is a block diagram of a computer system in accordance with a preferred embodiment of the present invention.

FIG. 1 is a block diagram of a computer system 100 in accordance with a preferred embodiment of the present invention. Computer system 100 includes a processor 102 and a memory 104. Memory 104 includes detector software 112 and a database 116. Database 116 contains information relating to attractions and/or interests entered by human beings. System 100 preferably connects to a display device 132, such as a display screen, and to an input device 134, such as a mouse or touchpad. Computer system 100 also includes a computer readable device 136, such as a disk drive or CD ROM device. Detector software 112 is preferably loaded into memory 104 via device 136.

Computer system 100 is preferably connected to a network, such as the Internet or an intranet via a connection 140. Computer system 100 includes appropriate software to enable computer system 100 to communicate with other computer systems over connection 140.

Figure 9:
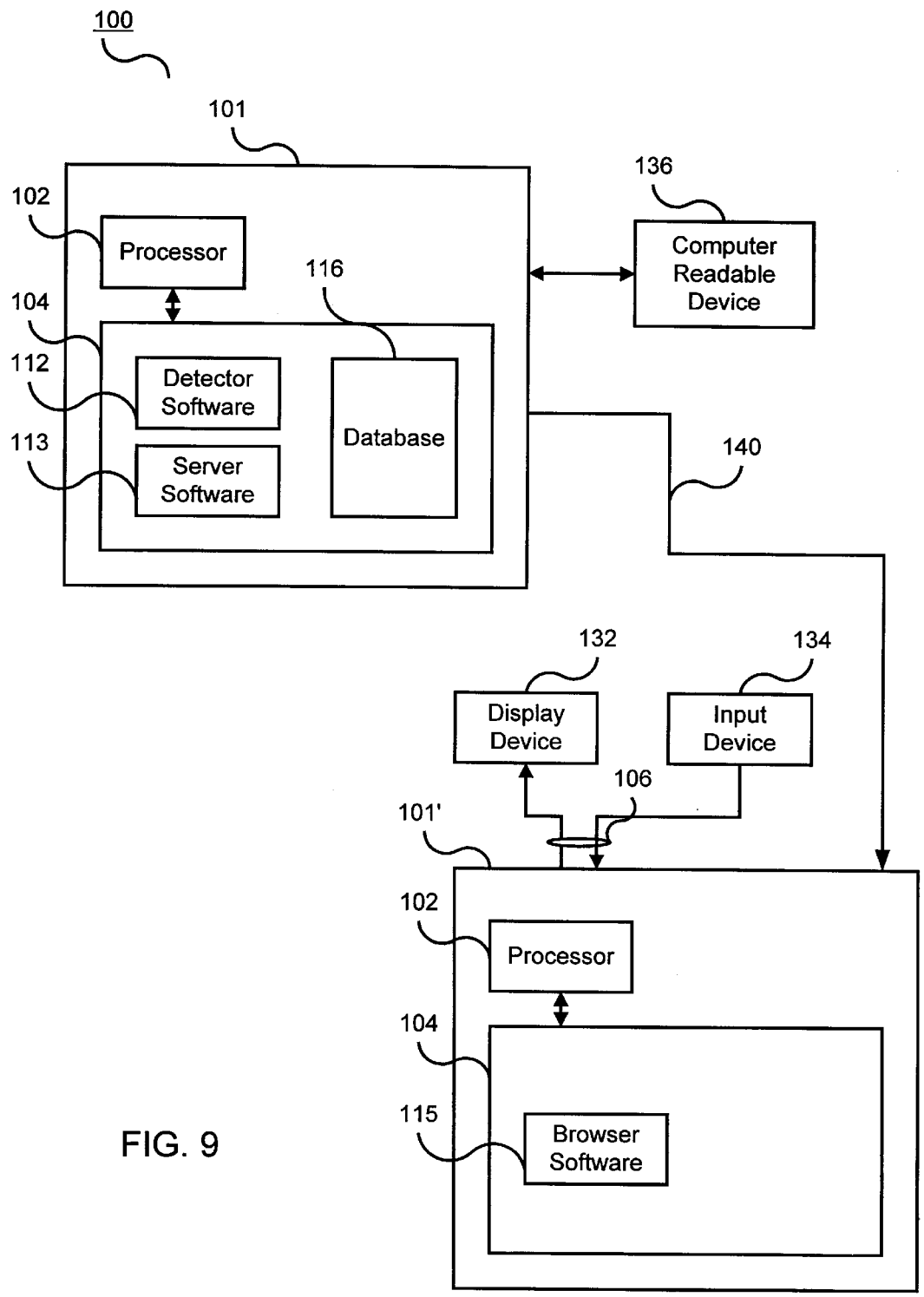
FIG. 9 is a block diagram showing an example of the present invention implemented using the World Wide Web.

In other embodiments, various functions of detector software 112 may be distributed in various computer systems of the network. An example of a World Wide Web implementation of detector software 112 is shown in FIG. 9, which is discussed below. It will be understood by persons of ordinary skill in the art that computer system 100 can include additional processors, memory, network connections, I/O devices, software, etc. that are not shown in the Figures for the sake of clarity of example. The present invention can be implemented on a wide variety of hardware, including those shown in FIGS. 1 and 9, or other suitable hardware configurations, such as network computers (NCs) and systems that bring the World Wide Web to TV.

In an alternate preferred embodiment (not shown), computer system 100 includes an interactive telephone input system (not shown) that allows the user to input attraction or interests to detector software 112 using the keys on a touchtone telephone or a similar device.

The present invention provides a way for people to indicate their mutual attraction or interests without fear of rejection, embarrassment, or public attention. The invention allows people to enter the names (or IDs) of other people for whom they feel love or attraction or with whom they believe they share an interest. These people are called "objects." The system periodically notifies people who are mutually attracted or have mutual interests. The term "interest" includes emotional interests, such as like, love, attraction, or other emotional feelings. The term "interests" also includes non-emotional interests. Examples of persons having non-emotional interests include business people who are interested in pursuing a deal or merger with another business, or persons wishing to enter into any other type of transactions where fear of non-confidentiality, fear of rejection, a wish to avoid publicity, etc. are a factor.

In other embodiments, various functions of detector software 112 may be a part of the Web, an online service such as America Online or Compuserve or part of an interactive telephone system. Thus, the software 112 may be distributed in various computer systems of the network.

Figure 2:
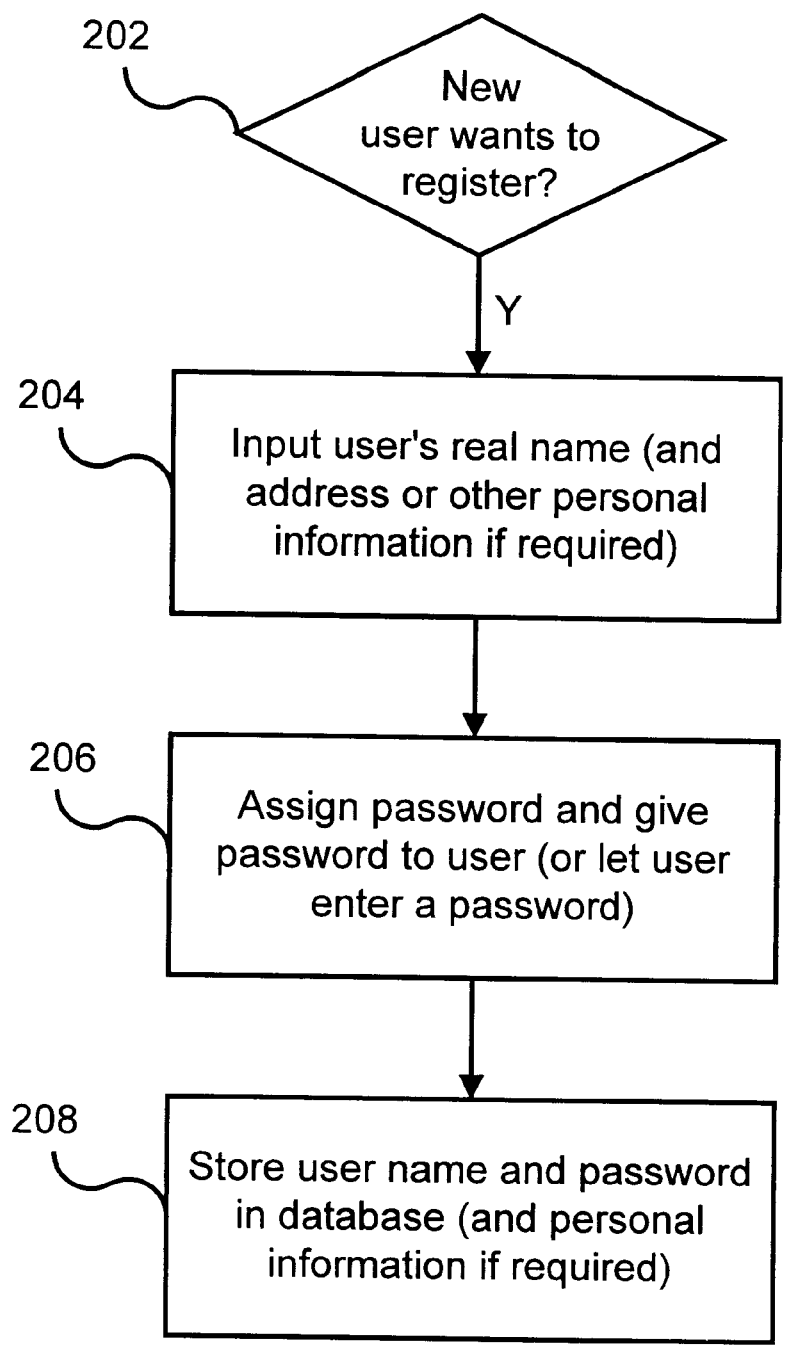
FIG. 2 is a flow chart showing steps performed in accordance with a preferred embodiment of the present invention to register a new user in the system.
Figure 3:
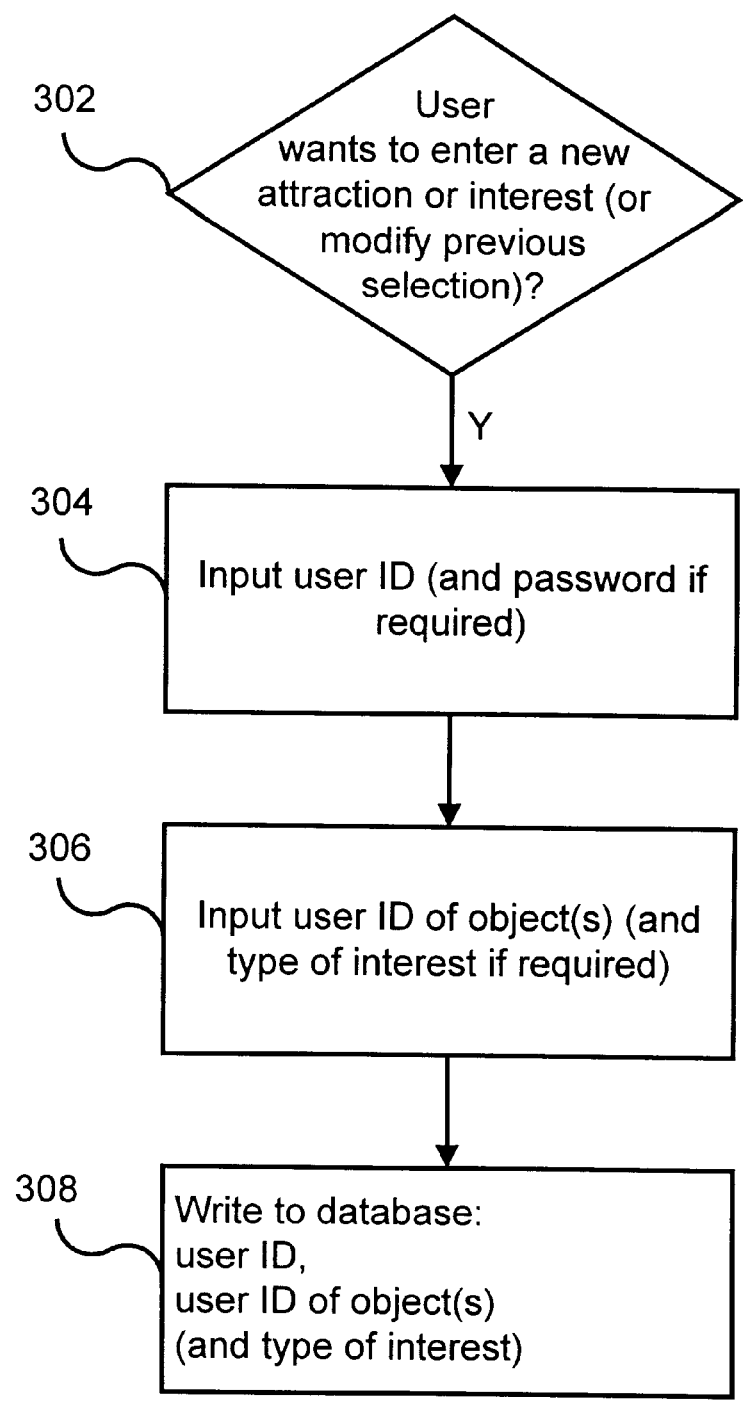
FIG. 3 is a flow chart showing steps performed to allow a human user to register an attraction.

FIGS. 2–4 are flow charts showing steps performed in accordance with the present invention. The steps of FIGS. 2–4 are performed by processor 102 and preferably are implemented as computer instructions of software 112 executed by processor 102. Each of these flow charts is discussed below in turn.

FIG. 2 is a flow chart showing steps performed in accordance with a preferred embodiment of the present invention to register a new user in the system. The registration operation is generally, but not always, performed. Registration lessens the possibility that people are logging on under false names and increases the security of the system. If, however, the system has only a small number of trusted users, all of whom are known to the system, then it might not be as necessary to register the users.

In step 202, the detector software determines that a new user wants to register with the system. In step 204, detector software prompts the user to enter his or her real name and address. In step 206, a password is assigned to the user and communicated to the user (or the user enters a password). Step 208 stores the user name, and password (and optional personal information) in memory 104. If a particular implementation of the invention includes a registration procedure, the user will be required to enter his or her password before he or she is able to enter new objects into the database in the future or modify a previous selection. Use of a password makes it less likely that people will log on under a false name and enter false objects into the database. Other ways to authenticate user identity include the use of public/private keys, digital signatures, or biometrics, such as fingerprint or retinal scans. In general, any appropriate method can be used to authenticate users.

FIG. 3 is a flow chart showing steps performed to allow a human user to register love or attraction. In step 302, the detector software determines that the user wants to enter a new object. For example, the user might select "Enter New Object" from a menu. If the user wants to make new entries, in step 304, the user is prompted (via display device 132) to enter his or her user ID. A user ID can take various forms. For example, the user may have been assigned an alphanumeric "handle" or an ID number. Alternately, the user ID may simply be the user's name or e-mail address. A user ID can also be any other type of personal identification, such as social security number, drivers license number, telephone number. A user ID can also be any of the above, with a geographic identifier (e.g., "gil sudai san francisco california"). Alternately, the geographic identifier can be considered a part of the user ID. It is important to note, however, that the ID used (e.g., user name) be known to the other users so that the users can enter the ID(s) into the system. Alternately, any suitable identifier can be used as a user ID.

As discussed above, the user may also be prompted to enter a password (or chooses a password) before he or she is allowed to enter new objects. Step 306 prompts the user to enter the user IDs of one or more "objects." A first implementation requires the user to type the ID(s) of the objects. In such a system, the identities of the users are not revealed to other users. Another implementation allows the user to select objects from a list of all possible objects (see areas 612 on FIG. 6(b)). In such a system, the identities of the users are revealed to other users.

Step 306 also allows users to indicate the type of attraction or interest he or she feels for his or her objects. For example, if the system allows the user to enter an attraction, the user can indicate whether he or she feels "love," "like," or "desire" for the objects. In a preferred embodiment, the user must choose these types from a predetermined list. Some implementations only have a single type of attraction. Other implementations default to "like." The present invention may be implemented using any appropriate numbers and types of attraction.

Figure 6A:
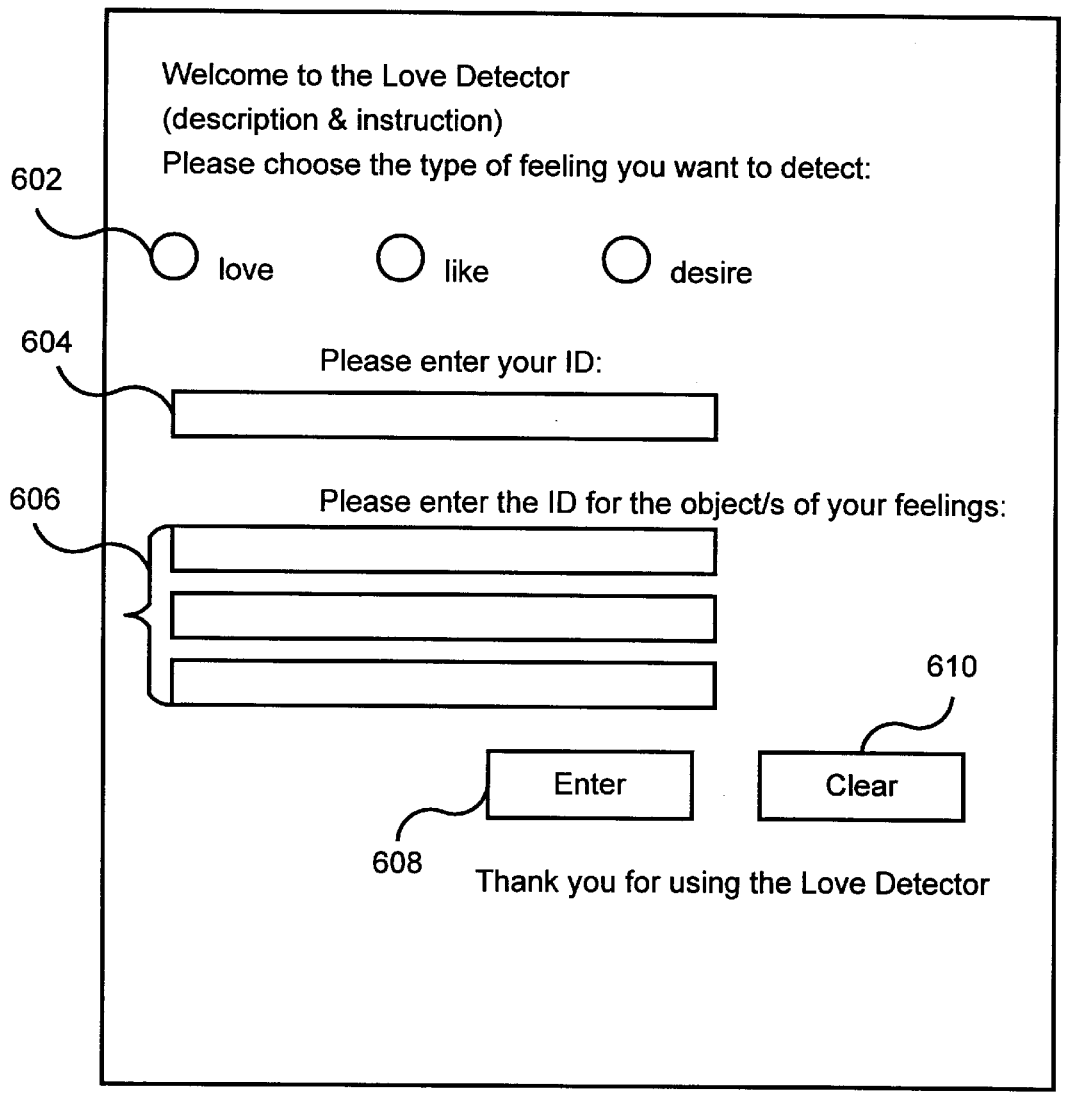
FIGS. 6(a) and 6(b) show examples of a screen shot of a form allowing a user to input an attraction for another person or an interest.
Figure 6B:
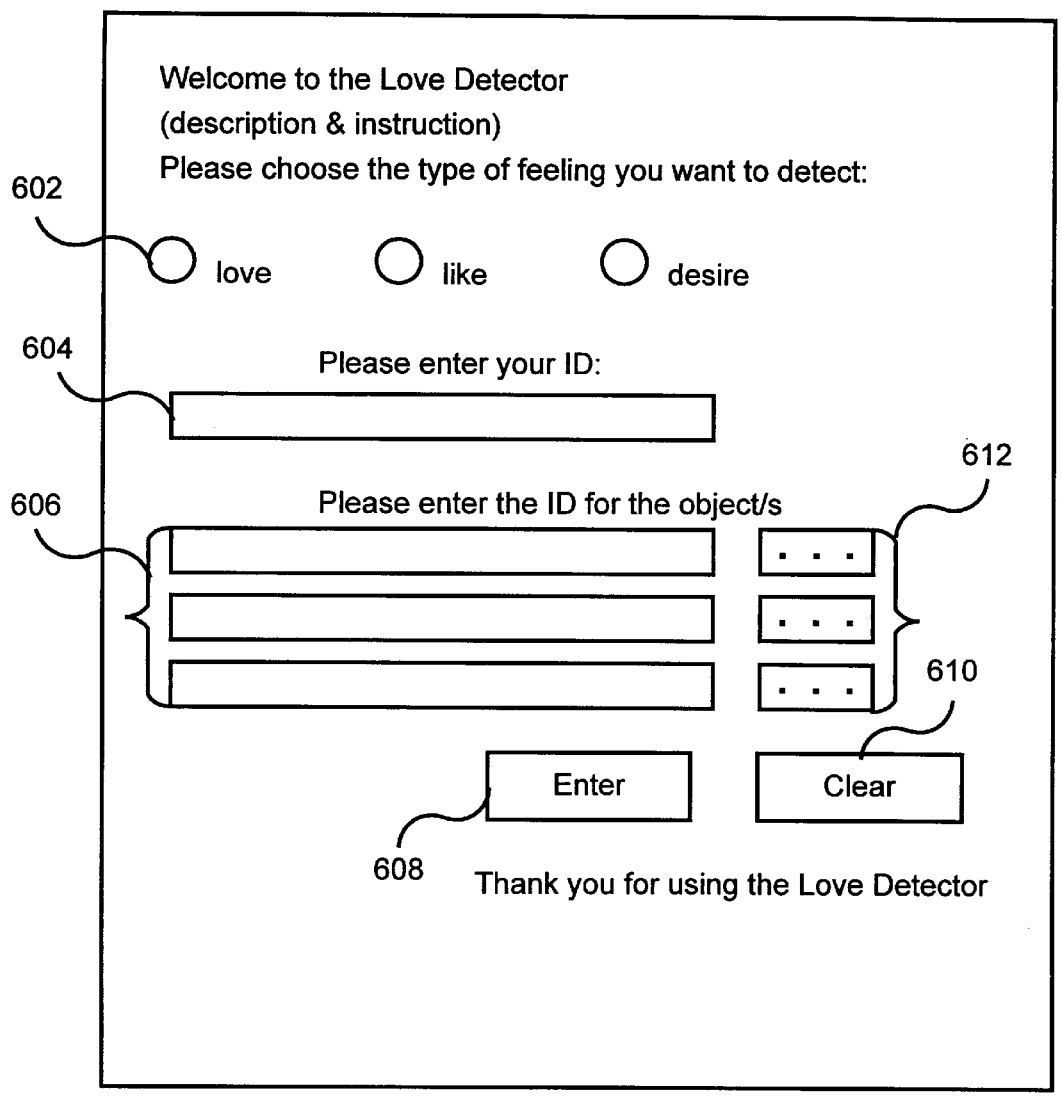

FIGS. 6(a) and 6(b) show examples of a computer screen of a form allowing a user to input an attraction for another person. The example of FIG. 6(a) shows a "Web form" displayed on display device 132 by browser 115 of FIG. 9. This form can be implemented using HTML, Java, or any other suitable method. The user uses input device 134 of FIG. 9 to enter information and browser software 115 sends the information to server software 113, where it is passed to detector software 112. As discussed above, any appropriate technology can be used to implement the present invention.

In FIG. 6(a), the user chooses between "love," "like," and "desire" 602. The user enters his or her ID in area 604. The user enters one or more objects in area 606. After inputting entries in areas 602, 604 and 606, the user can either "enter" the information by clicking on area 608 or clear the information by clicking on area 610. If the user indicates that the information should be entered, step 308 makes an entry in the database including the user ID, the user ID of the objects, and the types of attraction (if applicable).

An alternate embodiment does not use a "prompt and enter" model, but instead allows the user to register and to input his or her objects using e-mail. Instead of being prompted for the information shown in FIG. 6, the user sends an e-mail message to the detector software 112, where the e-mail message contains the user's ID, the IDs of the user's object(s) of attraction, and the type of attraction (if applicable).

Still another preferred embodiment allows the user to enter his or her ID and attraction or interest using an interactive telephone system. In this embodiment, the user calls a predetermined telephone number and is asked by a prerecorded message to enter his or her user ID using the keypad of their telephone (this could be, for example, a telephone number or any other type of appropriate user ID). The user is then prompted to enter the user ID of a person to whom he or she is attracted (or shares interests). The system then prompts the user to enter a type of interest of attraction. For example, the system may prompt "for liking, press one, for desire, press two." Once the user has entered information using such an interactive telephone system, detection and notification proceed in any of the ways described herein.

A preferred embodiment of the invention also allows the user to delete and change his or her objects. If the user indicates that a previously entered object should be deleted (and enters a correct password if required), the object is deleted from the database.

Figure 4A:
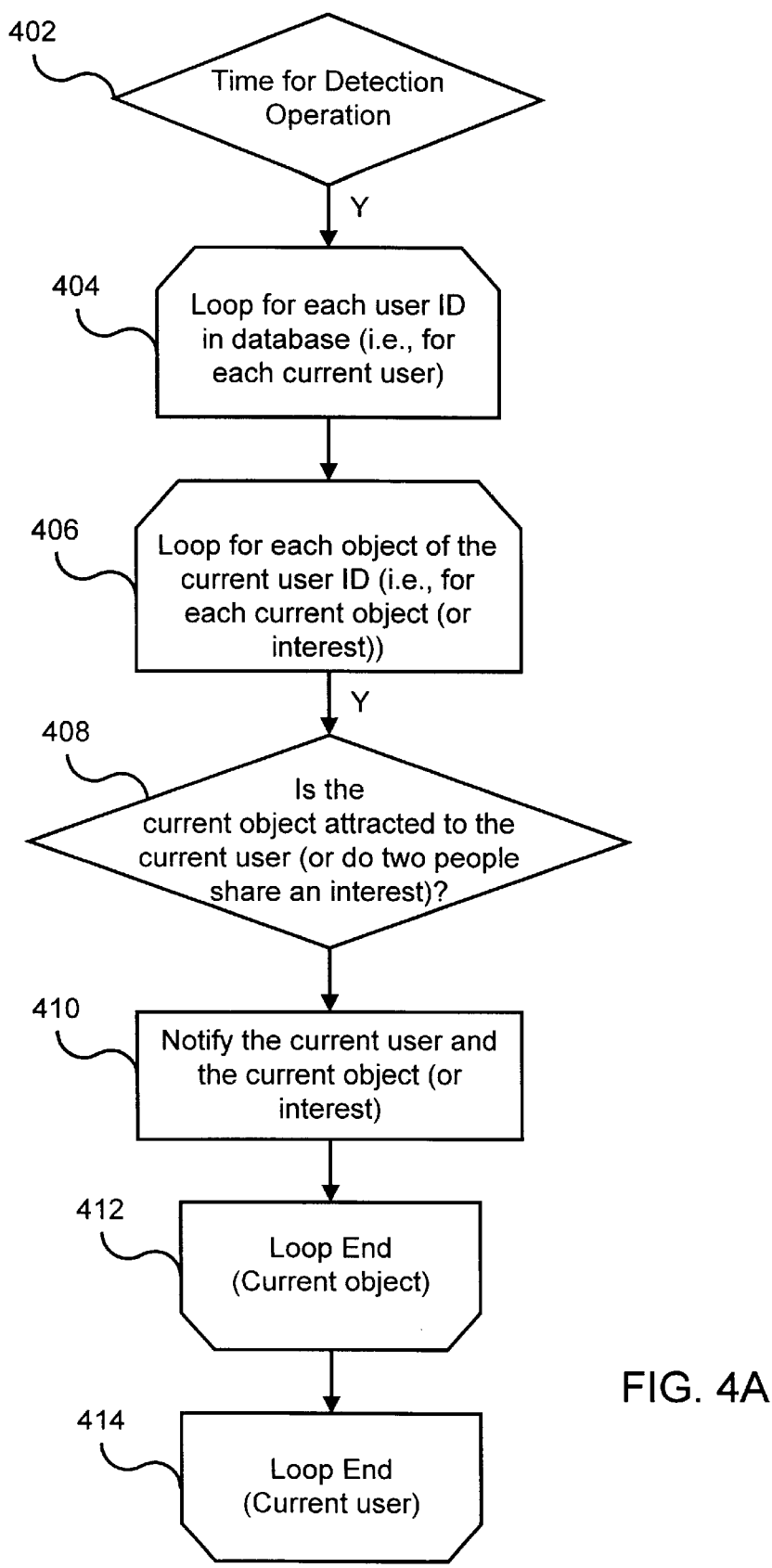
FIGS. 4(a) and 4(b) are flow charts showing steps to detect mutual attraction or interests.

FIG. 4(a) is a flow chart showing steps to detect mutual love or attraction. In a preferred embodiment of the invention, detector software 112 periodically performs the steps of FIG. 4(a). For example, the steps may be performed once a day. In an alternate embodiment, the determining step is performed each time a user enters objects. In an alternate embodiment, the steps may be performed at a predetermined "notification time" such as every Monday morning between 8am and 9am. Steps 404 through 414 represent a loop performed for each user ID in the database. Steps 406 through 412 represent a loop performed for each object for the current user ID.

It should be understood that, although the described system detects matches for two persons, the system can be expanded to detect matches among any number of persons.

FIG. 5 shows an exemplary format of a database used in conjunction with the described embodiment. It will be understood that the format shown is provided only for the purposes of example and that any appropriate database and database format can be used to implement the present invention. Each entry in the database 116 includes a user ID, and one or more user IDs of objects. Each entry in the database can also include a single type of attraction or interest for all objects in the entry or can contain a type of attraction or interest for each object in the entry. Some implementations have predetermined number of objects per user ID. Other implementations allow an unlimited number of objects.

In the described embodiment, it is known that each current user is attracted to (or has mutual interests with) his or her object(s). Step 408 of FIG. 4(a) determines whether the current object is also attracted to (or has mutual interests with) the current user ID. If the database has a field indicating a type of attraction or interest, then step 408 also checks whether the type of attraction or interest indicated by the user and the object is the same. In some implementations, the type of attraction or interest must match. In other implementations, all types match all types. In still other implementations, each user may indicate whether he or she wants to consider types of attractions or interests in determining whether a match has occurred.

FIG. 7(a) shows an example of a match where the user IDs are e-mail addresses and the types of attraction must match. In FIG. 7(a), a user having the user ID "john@yahoo.com" (his e-mail address) has indicated that he loves a user having a user ID of "kim@lycos.com." Conversely, "kim@lycos.com" has indicated a feeling of love for "john@yahoo.com." Thus, a match occurs and both parties are notified as discussed below. In FIG. 7(a), Tom and Linda entered each other's IDs, but indicated different types of attraction, so no match occurred. In other implementations, Tom and Linda would also match, even though they indicated different types of attractions. FIG. 7(b) shows an example of a match where the user IDs are the full names of the users. Again. John Smith and Kim Brown match.

Figure 4B:
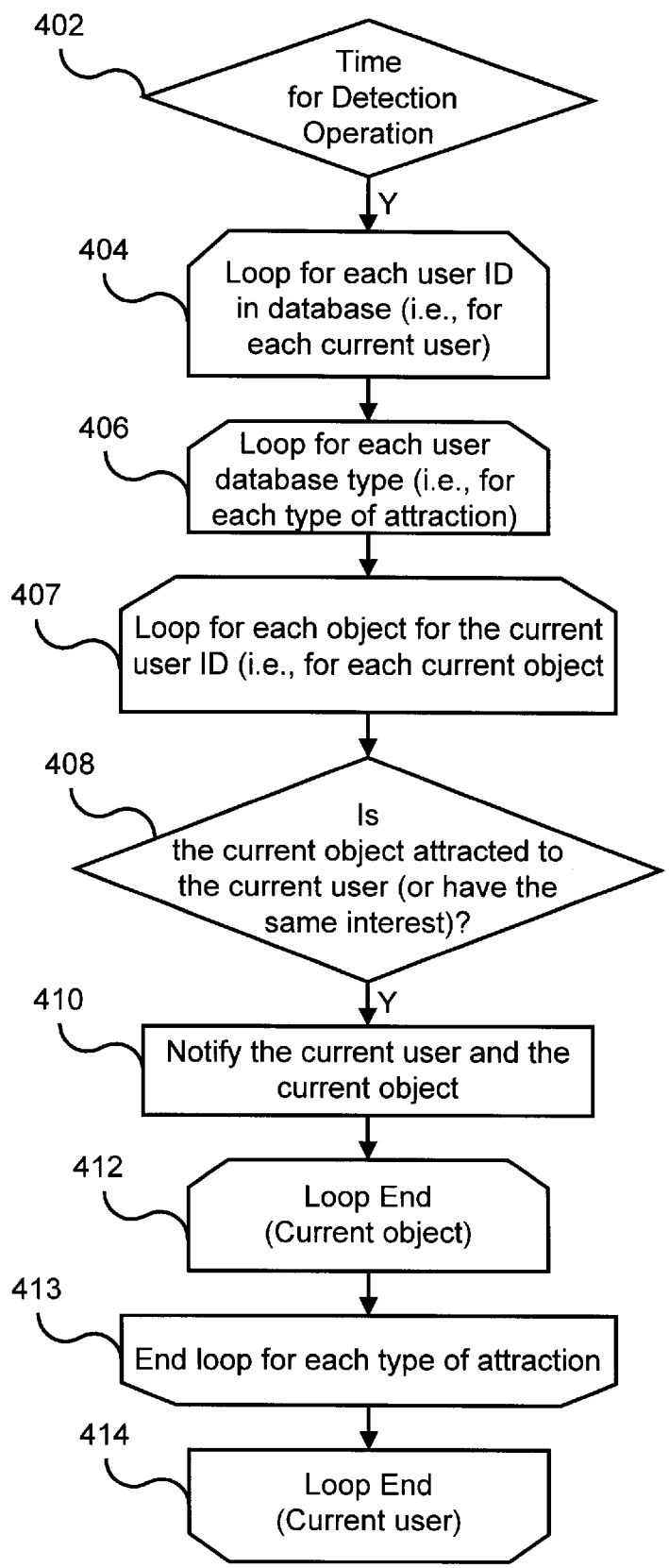

FIG. 4(b) shows another preferred embodiment having three loops. In this embodiment, each type of attraction or interest is stored in a different database. In FIG. 4(b), the third loop is for each type of attraction or interest database. In this embodiment, both the user and the object must have indicated the same type of attraction or interest for a match to have occurred.

If a match occurs, step 410 notifies the user and object that a match has occurred. As discussed below, this notification can take place in various ways. (A preferred embodiment checks to determine that only one notification occurs for each user/object pair). FIGS. 8(a) and 8(b) show examples of e-mail messages notifying the users of FIG. 7 of a mutual attraction Similar messages would be used to notify users of a mutual interest. In the messages of FIG. 8(a), the notification message identifies the users to each other by their user ID. In this example, the users may or may not know each other's true names. They are able to contact each other by e-mail and arrange a meeting if they so desire.

In another preferred embodiment, shown in FIG. 8(b) notification may not include the ID of the objects, but may state only, for example, that "your object #X has indicated mutual interest." This increases security because only the user receiving the e-mail knows the identity of his "object #X." (In some systems, the user also can check the system to verify the identity of his various objects).

In a preferred embodiment, notification preferably is performed simultaneously for both parties, once a match is discovered. In an alternate embodiment, both parties have previously agreed that one of the parties wants to be surprised, and notification is not simultaneous. For example, both a man and a woman may have agreed when they registered that the man will be notified 24 hours ahead of the woman when a match occurs. Thus, the man can initiate personal contact with his object once he is notified of the match. Some persons may prefer this alternative, if they both believe that men should make the initial move.

In another preferred embodiment, notification can be performed by an automatic telephone call made by the computer system 100; the World Wide Web (via a personal page or a general page using a user's ID and password); any other method of online communication; or any other appropriate notification method.

In addition, detector software 112 can include subsections which would work independently and which would be defined by one or more of the following:

the geographic location (e.g., a sub-system that matches only users in the San Francisco area)

the type of user (e.g., a sub-system that would only match high school students with high school students, university students with university student, club members with club members, etc.)

An alternate embodiment is implemented for a "private label," such as specifically for users belonging to a club, a company, a school, restaurant, bar, or another entity. For example, the users may enter their attractions and/or interests via a Web page that requires a password to gain access. Other implementations would only match club or group members with other club or group members.

Alternate embodiments of the present invention implement "rules" included, for example, in software 112, such as:

a person can choose only one "love" object and will not be able to change this object for at least one month.

a person can choose up to five "like" objects and is able to change any one of the objects at any time.

Such rules are implemented as computer instructions executed when the user is entering new objects.

Figure 10:
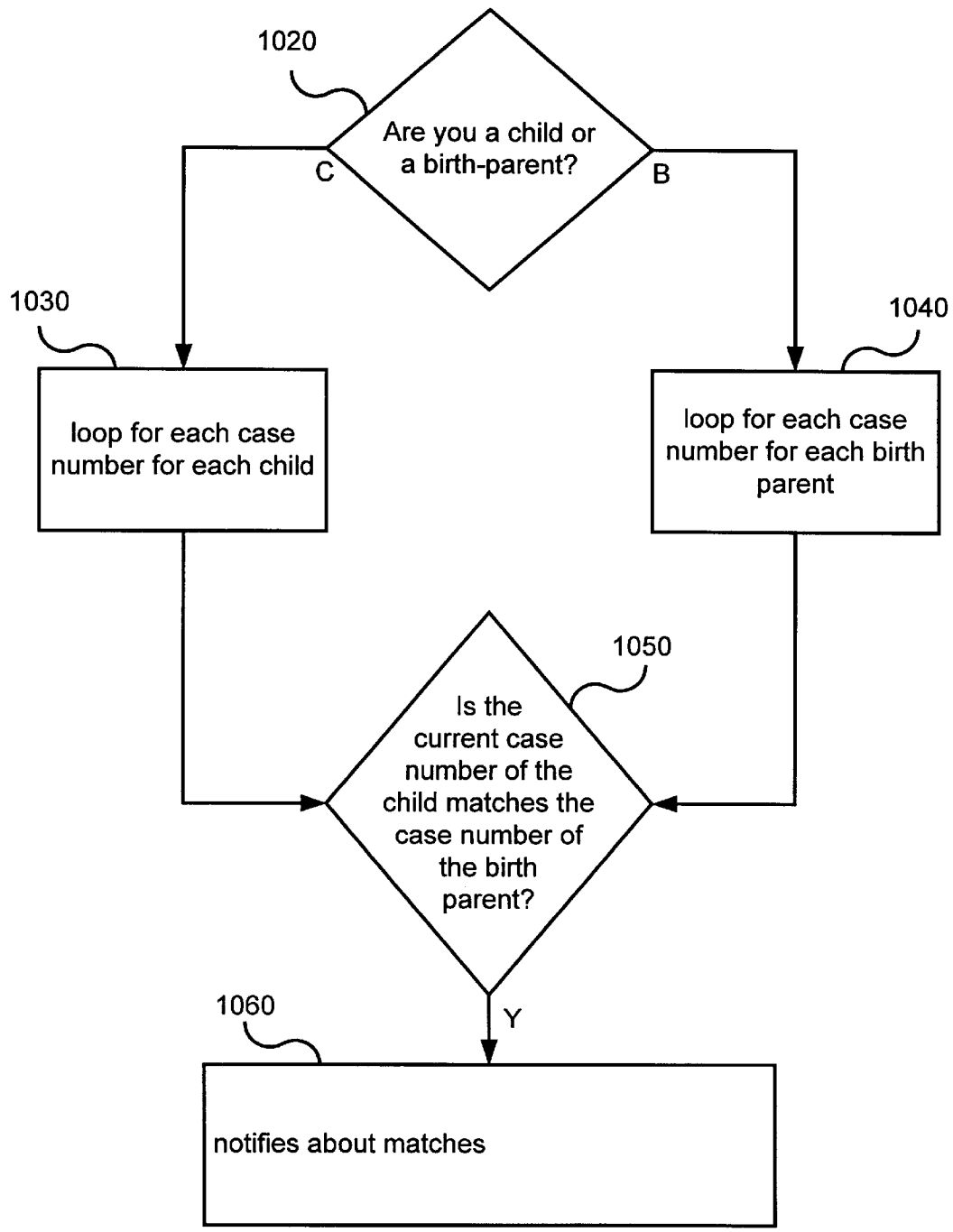
FIG. 10 is a flow chart showing a method performed to match persons whose interests are in finding their birthparents and in finding children placed for adoption.

FIG. 10 is a flow chart showing a method performed to match persons whose interests are in finding their birthparents and in finding children placed for adoption. This is a special case of the general "interest matching and notification" method described above. The adoption detector system detects and notifies persons who gave children up for adoption (the "birth parent") and the children adopted (the "child").

One implementation of such a system detects and notifies both parties when the parties know each other's name (or when the birthname of the child is known). Such a system detects matches similarly to the detection of mutual attraction or interests described above: When A enters B's name and B enters A's name, the system determines that the two people want to contact each other and notifies them in any of the manners described above.

In another implementation, each adoption file is assigned a case number. If two persons enter the same case number, then notification occurs using any of the methods described above.

In another implementation, the birthparent and child each separately registers his or her name is a database, where it is stored along with a case number for the adoption (Such as system requires that the registrant's case number already be stored in the system.). As shown in FIG. 10, if both the birthparent and the child have registered, this fact is determined in step 1050. If a match is detected, both parties are notified of the match in any of the manners described above. Such notification may indicate merely that a birthparent/child match has occurred and that the parties should now indicate a level of contact with which they feel comfortable. Other notification methods notify the birthparent/child of each others names, addresses, or other suitable contact information. Note that the adoption detector maintains anonymity of the birthparent and the child and does not notify either party unless it detects that there is mutual interest.

Figure 11:
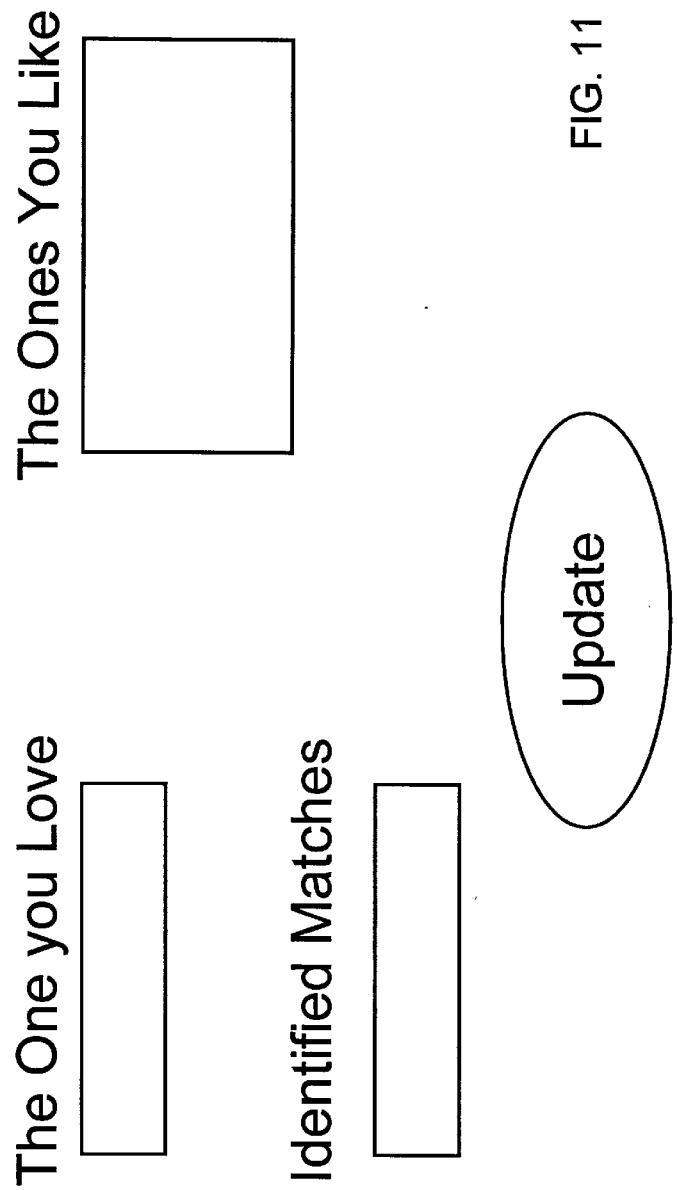
FIG. 11 shows an example of a personal Web page used by a preferred embodiment of the present invention.

FIG. 11 shows an example of a personal Web page used by a preferred embodiment of the present invention to receive input from a user. This is yet another method of combining the entry of input by users and notification to users that can be used with any of the variations of the present invention described herein. The user enters the names of the person(s) to whom he or she is attracted or shares interests. At notification time, the system modifies the personal pages of the user and his object to display the IDs of the persons who entered mutual attraction (or interests). Thus, a user simply looks at his or her personal Web page (using a browser) to determine whether any matches occurred.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. A method that notifies people that they feel reciprocal interest for each other, comprising the steps, performed by a processor of a data processing system having a memory, of:

receiving input from a first user indicating a user ID of a specific person in whom the first user has an interest, the first user already being aware of the existence of the person whose ID they entered;

receiving input from a second user indicating a user ID of a specific person in whom the second user has an interest, the second user already being aware of the existence of the person whose ID they entered;

determining whether the user ID of the person in whom the first user has an interest matches a user ID of the second user;

determining whether the user ID of the person in whom the second user has an interest matches a user ID of the first user; and if and only if a match occurs in both of the determining steps, notifying the first user and the second user that a match has occurred.

2. The method of claim 1, wherein the determining steps are performed at a predetermined interval.

3. The method of claim 1, where the determining steps are performed immediately after receiving user input.

4. The method of claim 1, where the determining steps and the notification step are performed at a predetermined "notification time."

5. The method of claim 1, wherein if the first user's feelings are not mirrored by the second user, the system will not notify either user and only the computer system will be aware of the first user's feelings for the second user.

6. The method of claim 1, wherein the step of receiving input from a first user indicating a user ID of a person includes receiving input from the first user through the World Wide Web.

7. The method of claim 1, wherein the step of receiving input from a first user indicating a user ID of a person includes receiving input from the first user by way of e-mail.

8. The method of claim 1, wherein the step of receiving input from a first user indicating a user ID of a person includes receiving input from the first user by way of an interactive telephone system.

9. The method of claim 1, wherein the step of receiving input from a first user indicating a user ID of a person includes receiving input from the first user by way of software executing on an online service.

10. The method of claim 1, wherein the step of receiving input from a first user indicating a user ID of a person includes receiving input from the first user by way of software executing on another data processing system in a network.

11. The method of claim 1, further comprising the steps of:
registering the first user; and
assigning a password to the first user.

12. The method of claim 1,
wherein the first and second users also enter a type of attraction and
wherein the determining steps determine that a match has occurred only when the first and second users also enter the same type of attraction.

13. The method of claim 1,
wherein the first and second users also enter a type of attraction, and
wherein the determining steps determine that a match has occurred no matter what types of attraction the first and second users enter.

14. The method of claim 1, wherein the first and second user IDs are one of the group including: a user name, an e-mail address, a social security number, a drivers license number, a telephone number, a name, a name with a geographic location, and a public key.

15. The method of claim 1, wherein the first and second user IDs also include a geographic designation.

16. The method of claim 1, further comprising the step of:
receiving, from the first user and the second user a type of attraction, including one of "love," "like," and "desire."

17. The method of claim 1, wherein at least one of the first user or the second user enters the ID of more than one person in whom they have an interest.

18. The method of claim 1, wherein the notification step automatically sends an e-mail message to the first user and the second user notifying them that a match has occurred.

19. The method of claim 1, wherein the notification step automatically places a telephone call to the first user and the second user notifying them that a match has occurred.

20. The method of claim 1, wherein the notification step automatically displays notifications on a personal Web pages of the first and of the second users, notifying them that a match has occurred.

21. The method of claim 1, wherein the step of receiving input from the first user further includes the step of implementing a rule about how many persons can be chosen for each type of attraction.

22. The method of claim 1, wherein the step of receiving input from the first user further includes the step of implementing a rule concerning the frequency with which persons can be changed by the users.

23. The method of claim 1, wherein the method is implemented for users of a specific geographic location.

24. The method of claim 1, wherein the method is implemented for users who belong to a specific institution.

25. The method of claim 1, wherein the method is implemented for users who are affiliated with a specific organization.

26. The method of claim 1, wherein the first user is a birthparent and the second user is an adopted child.

27. The method of claim 1, further comprising:
in response to the data processing system receiving the input of the first user, which indicates interest in the second user, but before receiving the input of the second user, sending a prompt to the second user that someone has indicated interest in the second user, without saying who it was that indicated interest, thereby prompting the second user to enter one or more IDs of people in whom the second user has an interest.

28. An apparatus that notifies people that they feel reciprocal interest for each other, comprising:
a first input portion, configured to receive input from a first user indicating a user ID of a specific person in whom the first user has an interest, the first user already being aware of the existence of the person whose ID they entered;
a second input portion, configured to receive input from a second user indicating a user ID of a specific person in whom the second user has an interest, the second user already being aware of the existence of the person whose ID they entered;
a first determining portion, coupled to the first and second input portions, configured to determine whether the user ID of the person in whom the first user has an interest matches a user ID of the second user;
a first determining portion, coupled to the first and second input portions, configured to determine whether the user ID of the person in whom the second user has an interest matches a user ID of the first user; and
a notifying portion, coupled to the first and second determining portions, configured to notify the first user and the second user if and only if the first and second determining portions have detected a match.

29. An apparatus that notifies people that they feel reciprocal interest for each other, comprising:
means for receiving input from a first user indicating a user ID of a specific person in whom the first user has an interest, the first user already being aware of the existence of the person whose ID they entered;
means for receiving input from a second user indicating a user ID of a specific person in whom the second user has an interest, the second user already being aware of the existence of the person whose ID they entered;
means for determining whether the user ID of the person in whom the first user has an interest matches a user ID of the second user and for determining whether the user ID of the person in whom the second user has an interest matches a user ID of the first user; and means for, coupled to the determining means, if and only if a match occurs in both of the determining means, notifying the first user and the second user that a match has occurred.

30. The apparatus of claim 28, further comprising:

a portion configured to send, in response to the apparatus receiving the input of the first user, which indicates interest in the second user, but before receiving the input of the second user, to send a prompt to the second user that someone has indicated interest in the second user, without saying who it was that indicated interest, thereby prompting the second user to enter one or more IDs of people in whom the second user has an interest.

31. A computer program product, comprising:

a computer usable medium having computer readable code embodied therein for notifying people that they feel reciprocal interest for each other, including:

computer readable program code devices configured to cause a computer to effect receiving input from a first user indicating a user ID of a specific person in whom the first user has an interest, the first user already being aware of the existence of the person whose ID they entered;

computer readable program code devices configured to cause a computer to effect receiving input from a second user indicating a user ID of a specific person in whom the second user has an interest, the second user already being aware of the existence of the person whose ID they entered;

computer readable program code devices configured to cause a computer to effect determining whether the user ID of the person in whom the first user has an interest matches a user ID of the second user;

computer readable program code devices configured to cause a computer to effect determining whether the user ID of the person in whom the second user has an interest matches a user ID of the first user; and computer readable program code devices configured to cause a computer to effect, if and only if a match occurs in both of the programming code devices, notifying the first user and the second user that a match has occurred.

\* \* \* \* \*